Dec. 26, 1967  C. CAMOSSI  3,360,225
PROCESS FOR MANUFACTURING ISOLATORS OF SHOCK ABSORBERS BASED
ON THE PRINCIPLE OF DAMPING VIBRATIONS AND/OR SHOCKS
BY MEANS OF MULTISTRAND CABLES
Filed June 11, 1963

INVENTOR.
CARLO CAMOSSI
BY McGlew and Toren
Attorneys

United States Patent Office 3,360,225
Patented Dec. 26, 1967

3,360,225
PROCESS FOR MANUFACTURING ISOLATORS OF SHOCK ABSORBERS BASED ON THE PRINCIPLE OF DAMPING VIBRATIONS AND/OR SHOCKS BY MEANS OF MULTISTRAND CABLES
Carlo Camossi, Viale San Michele del Carso 13, Milan, Italy
Filed June 11, 1963, Ser. No. 287,125
Claims priority, application Italy, Apr. 11, 1963, Patent 691,254
3 Claims. (Cl. 248—358)

The object of the present invention is to provide novel and improved isolators built on the principle of absorbing vibrations and/or shocks by means of multi strand cables.

There are isolators that provide for the clinching of the cable sections by means of mechanical clamping members or of the local pressing of the support on the cable.

In accordance with the present invention, the cable sections are anchored by means of casting, die-casting or moulding of the zones of support, whereby these zones remain embedded in the cast body of the support itself.

Compared to isolators or shock absorbers of known types, those which are the object of the present process invention are of a more compact construction because the cast or moulded portion attaches intimately and locks completely the length of embedded cable with a constant force; whereas a mechanical means locks more or less according to the surface roughness of the coupling members, and the compression, however small, of the cable diameter. There follows, according to this invention, a homogeneity of the elastic efficiency and a longer life of the device.

Another advantage consists in a lower production cost for evident reasons of time, material and labor savings.

The anti-vibration and anti-shock charactertistics are not impaired; on the contrary, it is possible to state that they are improved due to the greater compactness and homogeneity of the assembly, thereby constituting a much more sturdy and efficient unit, and in most cases of less weight.

Indeed, such devices, when built in the form of a corner member, offer three degrees of freedom and the whole corner member can be cast, die-cast, or moulded simultaneously, so as to obtain a greater strength of the supports, eliminating screws, locking nuts, etc. that become inefficient as a reult of vibrations.

These isolators and shock-absorbers can be produced in different ways, according to the operating requirements, and in addition to being composed of ferrous and other metallic materials, can be constructed of synthetic, and plastic material, nylon, rubber and the like.

The cables are arranged orthogonally or obliquely relative to the two supports, and preferably parallel to one another; the mutual distance between cables may vary according to the number thereof, their length, diameter, etc. and to the elasticity factor it is desired to obtain.

The attached drawing represents by example, some types of isolators embodying the invention of course, these are indicative examples and practically, may be multiplied and exemplified in many different shapes and types, and therefore the drawings and the detailed specifications thereof are not intended to limit the application of this invention.

Figure 1:
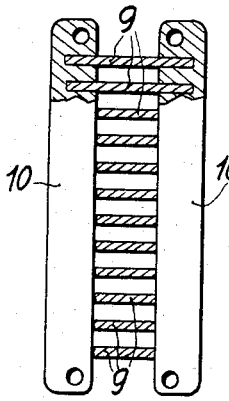
FIGURE 1 represents a first form of embodiment of the invention.

An examination of the drawing shows that an isolator, in its simplest form (FIGURE 1), is constituted by a plurality of cable sections 9, practically equal in length, arranged parallel to and equidistant from one another, the end portions whereof are embedded in two lateral bars 10 constituting the supports of said cables, and which, by means of suitable anchorings, are made fast to the two machine parts it is desired to isolate. The two lateral bars 10 are obtained by casting, diecasting or moulding, and the cable sections 9 are anchored therein during the casting or moulding operations.

In a modified form (FIGURE 2), a continuous cable 11 is arranged in the form of a serpentine so that the two zones of the bights 11' become embedded during the casting, diecasting, or moulding of the lateral bars 10, into the very material of which the bars 10 are composed, remaining firmly locked therein.

Figure 2:
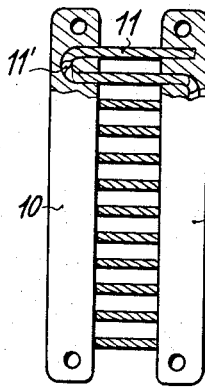
FIGURES 2 and 3 show modified forms of the invention.

In a further modified form (FIGURE 3), the cable 12 is also arranged in a serpentine way such as in FIGURE 2, but is embedded in the lateral bars 10 in such a way that the bights 12' extend from the outer edges of the bars 10.

Figure 6:
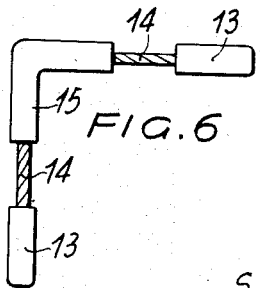
FIGURES 6 and 7 show, respectively, a corner isolator and a flat double isolator.
Figure 5:
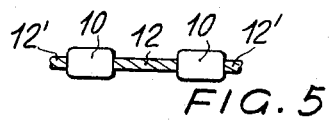

Following this same process of anchoring by means of casting die-casting or moulding, it is possible to obtain a corner piece such as the one shown in FIGURE 6, wherein two sets of cables 14, placed according to two orthogonal planes or forming an angle different from a right angle, have their diverging ends embedded within two bars 13, while their converging ends are embedded in an angle-shaped bar 15.

Figure 3:
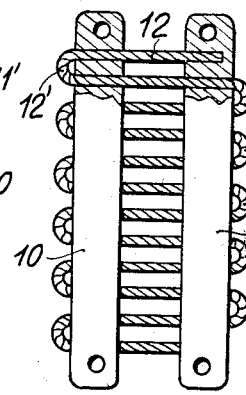
Figure 4:
FIGURES 4 and 5 represent, respectively, a side view and an end view of the isolator of FIGURE 3.
Figure 7:

It is further possible to obtain a flat isolator or shock-absorber with a double row of cables, such as shown in FIGURE 7, and, in this case, as in the others, the cable sections 16 can be cut one by one, or in pairs, or be formed by a single continuous cable bent in a serpentine, as previously explained and illustrated in FIGURES 2 and 3.

Figure 8:
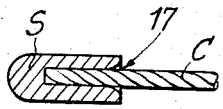
FIGURE 8 represents a sectional view of a particular detail of construction.

A technical measure of importance is represented in FIGURE 8. In order to graduate the anchoring of the cable C within the support S, and therefore to eliminate a possible cause of local wear, at the outlet of cable C from the body of the support S, there is provided a funnel-shaped flare 17, possibly rounded. In this way, the cable oscillations do not cause any damage at the outlet point 17.

While the principle characterizing the formation of shock-absorbers and isolators by means of cables anchored through casting die-casting or moulding remains unchanged, it will be possible to adopt changes or equivalent solutions which will all remain within the spirit and scope of the present invention.

What is claimed is:

1. A vibration and shock isolator comprising, in combination, at least a pair of spaced relatively rigid anchoring blocks of die cast synthetic resin; and at least one relatively flexible stranded bare metal cable section extending between and interconnecting each pair of blocks; each block being integral with and in intimate configuration-conforming contact with the bare metal surface of the strands of a substantial length of the connecting cable section at a respective end of the latter, whereby each cable section has its opposite ends integrally embedded in and anchored in respective blocks of the interconnected pair.

2. A vibration and shock isolator, as claimed in claim 1, wherein there are three anchoring blocks, including an intermediate block and two end blocks; each cable section interconnecting said intermediate block to a respective end block; said intermediate block being angular in end elevation, whereby the cable sections connecting the intermediate block to the respective end blocks extend at an angle to each other.

3. A vibration and shock isolator, as claimed in claim 1, wherein there are three anchoring blocks including an intermediate block and a pair of end blocks; each cable section extending between said intermediate block and a respective end block, and the cable sections connecting said intermediate block to the respective end blocks being substantially rectilinearly aligned in a common plane.

References Cited

UNITED STATES PATENTS

| | | | |
|---|---|---|---|
| 2,084,603 | 6/1937 | True | 264—261 X |
| 2,317,110 | 4/1943 | Person | 264—261 X |
| 2,372,950 | 3/1945 | Holmberg et al. | 264—261 X |
| 2,471,258 | 5/1949 | Bolten | 264—252 X |
| 2,581,845 | 1/1952 | Elhott | 264—261 X |
| 2,641,024 | 6/1913 | Panagrossi | 264—261 X |
| 2,937,805 | 5/1960 | Warnken | 264—261 X |
| 3,025,031 | 3/1962 | Kerley | 248—358 |
| 3,037,728 | 6/1962 | Kerley | 248—18 |
| 3,058,208 | 10/1962 | Hanshalter | 264—251 X |
| 3,086,600 | 4/1963 | Kerley | 248—350 X |

JOHN PETO, *Primary Examiner.*

ROBERT F. WHITE, CLAUDE A. LE ROY, *Examiners.*

L. S. SQUIRES, *Assistant Examiner.*